United States Patent
Ishihara et al.

(10) Patent No.: US 6,591,478 B2
(45) Date of Patent: *Jul. 15, 2003

(54) METHOD OF PRODUCING MAGNETIC HEAD

(75) Inventors: Hirohisa Ishihara, Niigata-ken (JP); Takao Soma, Aichi-ken (JP); Tadashi Otagiri, Aichi-ken (JP); Soichiro Matsuzawa, Mie-ken (JP)

(73) Assignee: Alps Electric Co., Ltd, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,508

(22) Filed: Apr. 14, 1999

(65) Prior Publication Data

US 2002/0054459 A1 May 9, 2002

Related U.S. Application Data

(62) Division of application No. 09/034,770, filed on Mar. 2, 1998, now abandoned.

(30) Foreign Application Priority Data

Mar. 3, 1997 (JP) ............................................. 9-048250

(51) Int. Cl.[7] ........................... G11B 5/127; H04R 31/00
(52) U.S. Cl. ............................... 29/603.07; 29/603.01; 29/603.12; 29/603.15; 29/603.16; 428/65.3; 428/141; 428/694; 360/120; 360/125; 360/126; 360/135
(58) Field of Search ................... 29/603.01, 603.07, 29/603.12, 603.15, 603.16; 428/65.3, 141, 694; 360/103, 110, 135, 120, 125.7

(56) References Cited

U.S. PATENT DOCUMENTS

| | | | |
|---|---|---|---|
| 4,212,044 A | 7/1980 | Plotto | 360/103 |
| 4,893,203 A | 1/1990 | Ezaki et al. | 360/103 |
| 4,992,901 A * | 2/1991 | Keel | 360/110 |
| 4,997,696 A * | 3/1991 | Kamada | 428/141 |
| 5,010,429 A | 4/1991 | Taguchi et al. | |
| 5,052,099 A * | 10/1991 | Taguchi | 29/603 |
| 5,079,657 A | 1/1992 | Aronoff et al. | |
| 5,083,365 A * | 1/1992 | Matsumoto | 29/603 |
| 5,108,812 A * | 4/1992 | Takahashi | 428/141 |

(List continued on next page.)

FOREIGN PATENT DOCUMENTS

| | | |
|---|---|---|
| JP | 56-107363 | 8/1981 |
| JP | 63-037874 | 2/1988 |
| JP | 01-213820 | 8/1989 |
| JP | 03-228274 | 10/1991 |
| JP | 04-281209 | 10/1992 |
| JP | 04-324175 | 11/1992 |
| JP | 05-089626 | 4/1993 |
| JP | 06-068632 | 3/1994 |
| JP | 07-065342 | 3/1995 |
| JP | 07-254248 | 10/1995 |
| JP | 08-063924 | 3/1996 |
| JP | 08-087733 | 4/1996 |
| JP | 8-087733 A * | 4/1996 |

*Primary Examiner*—A. Dexter Tugbang
*Assistant Examiner*—Paul D. Kim
(74) *Attorney, Agent, or Firm*—Brinks Hofer Gilson & Lione

(57) ABSTRACT

The use of a Nd-YAG laser or excimer laser enables easy formation of protrusions on a protecting layer and a portion of an opposite surface near the trailing side end thereof and a thin film element. It is thus possible to avoid direct contact between the thin film element and the disk surface, and thus prevent damage to the thin film element and wearing thereof even if a slider and the disk surface repeatedly slide on each other.

7 Claims, 9 Drawing Sheets

U.S. PATENT DOCUMENTS

| | | | |
|---|---|---|---|
| 5,162,073 A | | 11/1992 | Aronoff et al. |
| 5,220,470 A | * | 6/1993 | Ananth ........................ 360/103 |
| 5,327,311 A | * | 7/1994 | Ananth ........................ 360/103 |
| 5,329,689 A | * | 7/1994 | Azuma ......................... 29/603 |
| 5,347,412 A | | 9/1994 | Nitta et al. |
| 5,452,151 A | | 9/1995 | Money et al. ................. 360/75 |
| 5,458,947 A | * | 10/1995 | Yamada ...................... 428/141 |
| 5,467,237 A | * | 11/1995 | Takahashi ................... 360/114 |
| 5,479,306 A | * | 12/1995 | Ananth ........................ 360/103 |
| 5,513,056 A | | 4/1996 | Kawasaki et al. .......... 360/103 |
| RE35,477 E | * | 3/1997 | Hussinger ................ 29/603.07 |
| 5,612,839 A | * | 3/1997 | Jacques ....................... 360/103 |
| 5,625,512 A | | 4/1997 | Smith |
| 5,652,040 A | * | 7/1997 | Yamada ...................... 428/141 |
| 5,654,853 A | | 8/1997 | Hagen ......................... 360/106 |
| 5,673,161 A | | 9/1997 | Yanagisawa et al. ....... 360/103 |
| 5,685,064 A | * | 11/1997 | Matsuzaki ............... 29/603.12 |
| 5,713,123 A | * | 2/1998 | Toyoda .................... 29/603.12 |
| 5,759,428 A | * | 6/1998 | Balamane .............. 219/121.66 |
| 5,761,790 A | * | 6/1998 | Carr ........................ 29/603.15 |
| 5,768,055 A | * | 6/1998 | Tian ............................ 360/103 |
| 5,774,303 A | | 6/1998 | Teng et al. .................. 360/103 |
| 5,799,388 A | * | 9/1998 | Shouji ..................... 29/603.09 |
| 5,841,608 A | | 11/1998 | Kasamatsu et al. ......... 360/103 |
| 5,858,474 A | * | 1/1999 | Meyer ........................ 427/555 |
| 5,876,824 A | | 3/1999 | Noguchi .................... 428/65.3 |
| 5,880,899 A | | 3/1999 | Blachek et al. ................ 360/66 |
| 5,886,856 A | | 3/1999 | Tokuyama et al. .......... 360/103 |
| 5,903,968 A | * | 5/1999 | Shouji ..................... 29/603.09 |
| 5,908,683 A | * | 6/1999 | Suzuki ........................ 427/141 |
| 5,939,170 A | | 8/1999 | Nishimori ................... 428/141 |
| 5,976,714 A | * | 11/1999 | Arita .......................... 428/694 |
| 5,991,118 A | | 11/1999 | Kasamatsu et al. ......... 360/103 |
| 6,014,296 A | * | 1/2000 | Ichihara ...................... 360/135 |
| 6,017,605 A | * | 1/2000 | Yamazaki .................. 428/65.3 |
| 6,061,897 A | * | 5/2000 | Shouji ..................... 29/603.12 |
| 6,094,805 A | * | 8/2000 | Iijima ...................... 29/603.12 |
| 6,101,066 A | * | 8/2000 | Ishihara ...................... 360/103 |
| 6,106,679 A | * | 8/2000 | Westwood ............. 204/192.32 |

* cited by examiner

METHOD OF PRODUCING MAGNETIC HEAD

This application is a divisional of copending U.S. patent application Ser. No. 09/034,770 Filed on Mar. 2, 1998, now abandoned.

BACKGROUND OF THE INVENTION

1. Field of the Invention

The present invention relates to a magnetic head mounted on, for example, a hard disk drive, and comprising a slider, and particularly to a magnetic head wherein the starting force required for starting a recording medium is decreased, and at the same time, a thin film element provided on the trailing side end of a slider can be protected from contact with the recording medium, and a production method thereof.

2. Description of the Related Art

FIG. 8A is a plan view showing a magnetic head mounted on a hard disk with a surface opposite to a recording medium upward, FIG. 8B is a sectional view of the magnetic head shown in FIG. 8A taken along line VIIIB—VIIIB of FIG. 8A, and FIG. 8C is a sectional view of the magnetic head shown in FIG. 8A taken along line VIIIC—VIIIC of FIG. 8A.

In the magnetic head H shown in these drawings, the upstream side (a) in the movement direction X of a disk is referred to as the leading side, and the downstream side (b) is referred to as the trailing side. A slider 1 comprises a ceramic material, and rails 4 are formed on both sides of an air groove 7 in a portion of the slider 1 opposite to the disk. As shown in FIG. 8B, each of the rails 4 has a convex sectional shape, and an opposite surface (air bearing surface; ABS) 5 is formed at the top of the convex sectional shape of each of the rails 4 so as to contact the recording surface of the disk when the magnetic head H is stopped. Each of the opposite surfaces 5 is processed to a crown shape with a predetermined curvature. As shown in FIG. 8C, each of the rails 4 has an inclined surface 6 formed at the leading-side end thereof.

As shown in FIGS. 8A and 8C, at the end 2 of the slider 1 on the trailing side (b) thereof are provided a thin film element 3 and a protecting film 8 for covering the thin film element 3. The thin film element 3 comprises a MR head (reading head) for detecting a fringing magnetic field to read a magnetic signal, and an inductive head (writing head) having a coil patterned thereon. The protecting film 8 comprises a non-magnetic ceramic material, e.g., aluminum oxide ($Al_2O_3$) or the like.

The slider 1 of the magnetic head H is supported by a flexure fixed at the tip of a load beam comprising a leaf spring so as to be urged on the disk by the elastic force of the load beam. The magnetic head H is used for a so-called CSS (Contact Start Stop) system hard disk device in which when the disk is stopped, the opposite surfaces 5 of the slider 1 contact the recording surface of the disk due to the elastic force. When the disk is started, a flow of air is guided into between the slider 1 and the surface of the disk along the movement direction (X direction) of the disk, and the opposite surfaces 5 are subjected to floating force of the flow of air to float the slider 1 at a short distance from the surface of the disk.

In the floating state, the slider 1 is in an inclined state wherein the leading side (a) rises from the disk more than the trailing side (b). In this floating state, the MR head of the thin film element 3 detects a magnetic signal from the disk, or the inductive head writes the magnetic signal.

A disk driving motor provided on the CSS system hard disk device requires starting torque sufficient to securely start the disk and the slider sliding. When the starting torque required for starting the disk and the slider is increased, a large motor must be used for the hard disk drive, thereby limiting miniaturization of the device and causing the problem of increasing power consumption.

The torque required for starting the disk depends upon the static frictional force between the opposite surfaces 5 of the slider 1 and the disk surface. In order to decrease the starting torque required for starting the disk, it is necessary to decrease the static frictional force.

In a conventional hard disk serving as a recording medium, since the disk surface has relatively high roughness, even if the opposite surfaces 5 of the slider are relative smooth surfaces, it is possible to decrease the real contact area between the disk surface and the opposite surfaces 5, and consequently possible to decease the static frictional force.

However, a recent hard disk for high-density recording has had the tendency that the disk surface becomes smooth. The reason for this is that when the surface of the hard disk is roughed, protrusions are nonuniformly formed on the disk surface, and thus the slider 1 in a floating state collides with the protrusions on the disk surface to damage the disk surface during magnetic recording or reproduction by the magnetic head. When the slider 1 repeatedly collides with and contacts the protrusions on the disk surface, the thin film element 3 mounted at the end 2 of the slider 1 is damaged, thereby deteriorating recording and reproduction performance. In addition, heat is generated by collision and contact between the slider 1 and the disk surface, thereby causing the problem of generating noise in the reproduced output. Particularly, in a hard disk for high-density recording, it is necessary to decrease the spacing between the thin film element 3 and the disk surface, and thus avoid the formation of irregular protrusions on the disk surface. Therefore, the hard disk for high-density recording tend to have a smooth disk surface close to a mirror surface.

When the disk surface of the hard disk is a smooth surface, the above problems can be solved. However, when both the disk surface and the opposite surfaces 5 of the slider are smooth surfaces, a lubricant or water film coated on the disk surface are present between the disk and the slider 1 when the hard disk device is stopped, and thus the slider 1 is adhered to the disk. Therefore, the static frictional force is increased when the disk is started, and large starting torque is thus required for starting the disk.

Therefore, in a hard disk device having a smooth disk surface for high-density recording, it is necessary to rough the opposite surfaces 5 of the slider 1 to decrease the real contact area between the opposite surfaces 5 and the disk surface.

As a method for roughing the opposite surfaces 5 of the slider 1, for example, a texturing method is known in which the opposite surfaces 5 are chemically etched or sputtered to form protrusions on the opposite surfaces 5.

However, this method easily damages the thin film element 3 by chemical etching and increases an element recess. An increase in the element recess causes an increase in spacing loss between the thin film element 3 and the disk surface, and deterioration in the efficiency of signal writing and reading sensitivity. In some cases, the thin film element 3 is broken, thereby making normal reading and writing impossible.

The above texturing process is difficult to form protrusions around the thin film element 3 without damaging the thin film element 3. Therefore, no protrusion is formed around the thin film element 3, and thus the thin film element 3 contact directly the disk surface when the hard disk is stopped. When sliding of the hard disk is started, the thin film element 3 is liable to be damaged and worn.

Further, the texturing process requires complicated steps and many steps, and the processing equipment used in the texturing process is very expensive.

SUMMARY OF THE INVENTION

The present invention has been achieved for solving the above problems of a conventional magnetic head, and an object of the present invention is to provide a magnetic head which permits easy formation of protrusions on opposite surfaces of a slider using a laser, and particularly a magnetic head which permits formation of protrusions around a thin film element without damage to the thin film element, and a production method thereof.

In order to achieve the object, the present invention provides a magnetic head comprising a slider which contacts the surface of a recording medium when the recording medium is stopped, and which assumes a floating state after the recording medium is started wherein the trailing side end thereof floats or slides on the recording medium due to the floating force of a flow of air on the surface of the recording medium; a magnetic recording and/or reproducing thin film element provided at the trailing side end of the slider; and a protecting film for covering the thin film element; wherein protrusions are formed on the surface of the protecting layer opposite to the recording medium (the face surface) and/or a portion of the face surface of the slider in the vicinity of the trailing side end.

Also protrusions are preferably formed on a portion of the face surface other than the vicinity of the trailing side end.

Further, the protrusions formed in the vicinity of the trailing side end are preferably denser than the protrusions formed on a portion of the opposite surface other than the vicinity of the trailing side end.

Further, the protrusions formed on the protecting layer and the face surface preferably have an average height of 5 to 50 nm.

On the protecting layer and the face surface is preferably formed a hard carbon thin film which is more preferably deposited to a thickness of 5 to 15 nm.

In the present invention, the slider can be formed by using $Al_2O_3$—TiC comprising a mixture of $Al_2O_3$ (aluminum oxide) crystal grains and TiC (titanium carbide) crystal grains, or Si (silicon).

The present invention also provides a method of producing a magnetic head comprising a slider which is made of a ceramic material, which contacts the surface of a recording medium when the recording medium is stopped, and which assumes a floating state after the recording medium is started wherein the trailing side end thereof floats or slides on the recording medium due to the floating force of a flow of air on the surface of the recording medium; a magnetic recording and/or reproducing thin film element provided at the trailing side end of the slider; and a protecting film for covering the thin film element; the method comprising smoothing face surface of the protecting layer opposite to the recording medium and the face surface of the slider, and then applying a laser beam to at least the protecting layer and/or the trailing side end of the face surface to form protrusions.

After the protrusions are formed, a hard carbon thin film is preferably formed on the face surface of the protecting layer and the face surface.

Since the hard carbon thin film is formed on the protecting layer and the face surface, the protrusions formed on the protecting layer and the face surface are hardly worn even if the slider and the disk surface repeatedly slide on each other.

In the present invention, a Nd-YAG laser can be used as a laser for emitting the laser beam, and a secondary higher harmonic or quaternary higher harmonic can be used as the laser beam of the Nd-YAG laser.

As the laser for emitting the laser beam, an excimer layer can also be used.

In the present invention, the protrusions are formed on at least the protecting layer around the thin film element and/or a portion of the face surface of the slider in the vicinity of the trailing side end thereof so that the thin film element does not contact directly the disk surface. Therefore, even if the slider and the disk surface repeatedly slide on each other, the thin film element is protected by the protrusions, thereby hardly causing the problem of breaking the thin film element.

Also, in the present invention, the laser beam is applied to the face surface of the slider and the protecting layer, which are polished, to form the protrusions. The use of the laser facilitates the formation of the protrusions, and facilitates the formation of the protrusions in any desired region. It is thus possible to easily form the protrusions around the thin film element without damaging the thin film element. In addition, since neither mechanical stress nor thermal stress is applied to the face surface of the slider and the periphery of the thin film element during laser processing, neither crack nor strain in a junction occurs. It is also possible to arbitrarily change the shape of the protrusions and the average height thereof by appropriately selecting the type of the laser used and the output of the laser beam.

Although, when the slider is in a floating state, the trailing side end thereof with the thin film element provided floats or slides on the recording medium, but the sliding may be either continuous or incontinuous.

DESCRIPTION OF THE PREFERRED EMBODIMENT

Figure 1A:
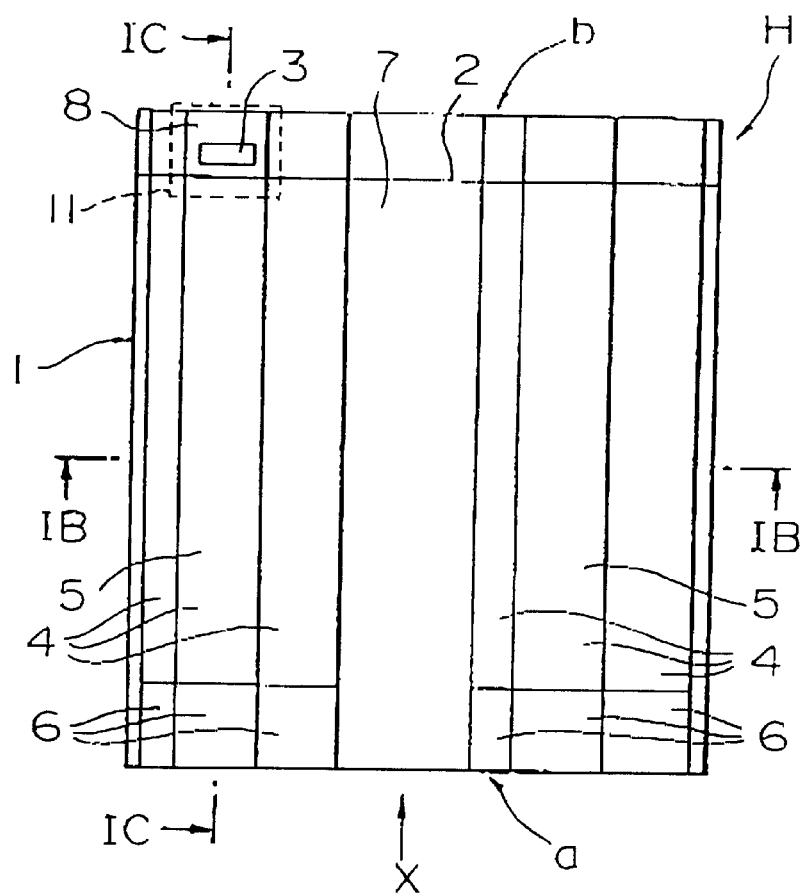
FIG. 1A is a plan view showing a magnetic head in accordance with a first embodiment of the present invention in an inverted position with a face surface opposite to a disk directed upward.
Figure 1B:
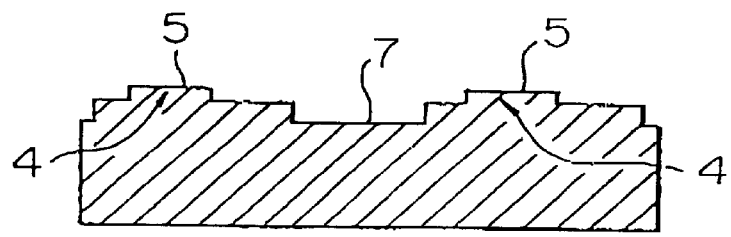
FIG. 1B is a sectional view taken along line IB—IB in FIG. 1A.
Figure 1C:
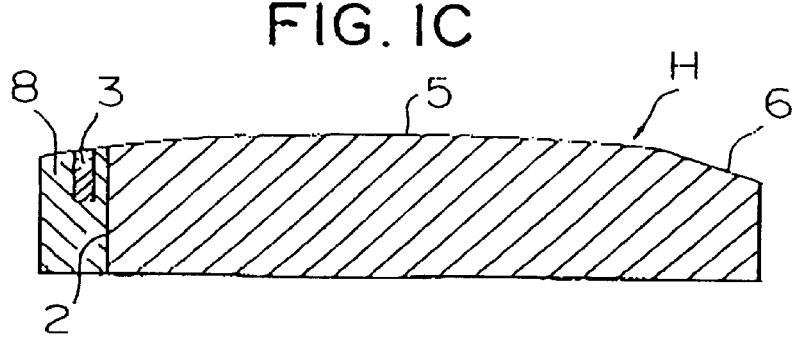
FIG. 1C is a sectional view taken along line IC—IC in FIG. 1A.

FIG. 1A is a plan view showing a magnetic head mounted on a hard disk or the like in accordance with a first embodiment of the present invention, with a surface opposite to a recording medium directed upward, FIG. 1B is a sectional view of the magnetic head shown in FIG. 1A taken along line IB—IB in FIG. 1A, and FIG. 1C is a sectional view of the magnetic head shown in FIG. 1A taken along line IC—IC in FIG. 1A.

The slider 1 of the magnetic head H shown in FIG. 1 comprises a ceramic material and has an air groove 7 formed in a portion thereof opposite to the hard disk serving as a recording medium, and rails 4 formed on both sides of the air groove 7.

In the present invention, as the ceramic material for forming the slider 1, aluminum oxide-titanium carbide $Al_2O_3$—TiC comprising a mixture of $Al_2O_3$ (aluminum oxide) crystal grains and TiC (titanium carbide) crystal grains, or Si (silicon) can be used.

$Al_2O_3$—TiC has excellent wear resistance and cutting performance, and silicon is suitable for fine processing.

Besides the above two ceramic materials, $Al_2O_3$, $Al_2O_3$—$TiO_3$, $CeO_2$—$ZrO_2$, $Y_2O_3$—$ZrO_2$, TiC, SiC, WC, $Si_3N_4$ and AlN can also be used, and these ceramic materials have excellent wear resistance and heat resistance.

In the present invention, the ceramic materials may be used singly or as a compound comprising at least two materials.

Each of the rails 4 has a convex sectional shape, as shown in FIG. 1B, in which a face surface (air bearing surface; ABS) 5 is formed at the top of each of rails 4. Each of the face surfaces 5 is formed in a crown shape having a predetermined curvature, many protrusions being formed on the surface by a laser.

On the end surface (end) 2 of the slider 1 on the trailing side (b) thereof is provided a thin film element 3 which is covered with a protecting layer 8 comprising a ceramic material such as aluminum oxide ($Al_2O_3$) except the surface opposite to the recording medium, as shown in FIGS. 1A and 1C. Like the face surfaces 5, many protrusions are also formed on the face surface of the protecting layer 8 by a laser.

The thin film element 3 comprises a laminate of a magnetic material such as permalloy (Ni—Fe alloy), and an insulation material such as aluminum oxide, and includes a magnetic sensing region for reproducing the magnetic recorded signals recorded on the disk or a magnetic recording region for recording magnetic signals on the disk, or both the magnetic sensing region and the magnetic recording region. The magnetic recording region comprises a MR head composed of a magnetoresistive element (MR element). The magnetic sensing region comprises an inductive head having a coil and core which are patterned thereon.

The slider 1 of the magnetic head H shown in FIG. 1 is supported by a flexure provided at the tip of a load beam. The slider is urged on a hard disk serving as a recording medium by predetermined force.

The magnetic head is used for a CSS system hard disk device (magnetic recording/reproducing device). When the disk is stopped, the face surfaces 5 of the face surface of the slider 1 contact the disk surface. When the disk is moved in the X direction shown in FIG. 1, the whole slider 1 floats on the disk surface by a flow of air introduced into between the slider 1 and the disk to create a floating state wherein the leading side (a) more rises from the disk than the trailing side (b). Alternatively, only the leading side (b) floats on the disk surface to create a floating state wherein the end on the trailing side (b) slides on the disk surface in continuous or non continuous contact therewith.

In the present invention, many protrusions are formed on the opposite surfaces 5 of the slider and the protecting layer 8 by a laser, as described above. Although the type of the laser used will be described later, laser formation of the protrusions is very simple, and is capable of reducing the number of the steps and substantially precisely forming the protrusions at any desired positions. It is thus possible to form the protrusions on the protecting layer 8 near the thin film element 3 without damaging the thin film element 3. During laser processing, neither mechanical stress nor thermal stress is applied to the slider 1, and thus neither crack nor strain in a junction occurs.

Of the protrusions formed on the face surfaces 5 and the protecting layer 8 by the laser, the shape and position of the protrusions formed around the thin film element 3 will be described below with reference to FIG. 2. The protrusions formed on a portion other than the vicinity of the thin film element 3 have the same shape as those of the protrusions shown in FIG. 2.

FIG. 2 is an enlarged plan view showing the protrusions formed in the region 11 shown in FIG. 1.

Figure 2A:
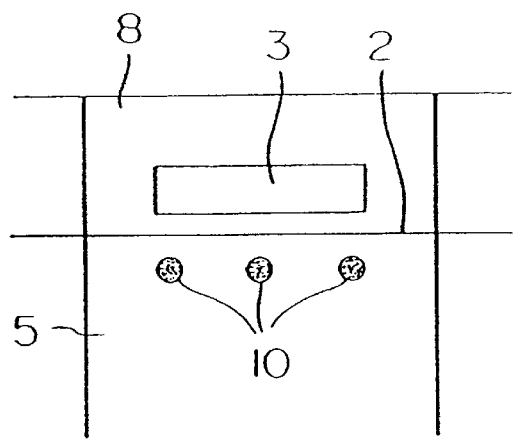
FIGS. 2A to 2D are plan views each showing the shape and position of the protrusions formed in the periphery of a thin film element of the magnetic head shown in FIG. 1.
Figure 2B:
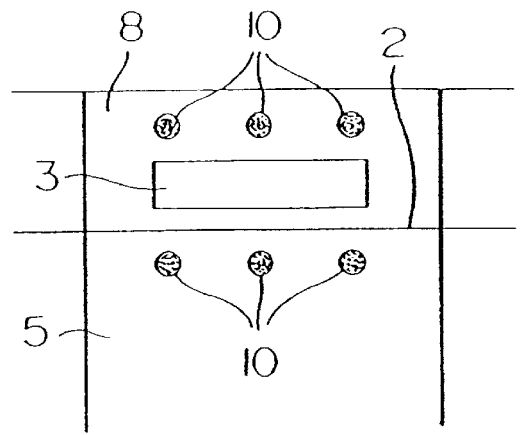
Figure 2C:
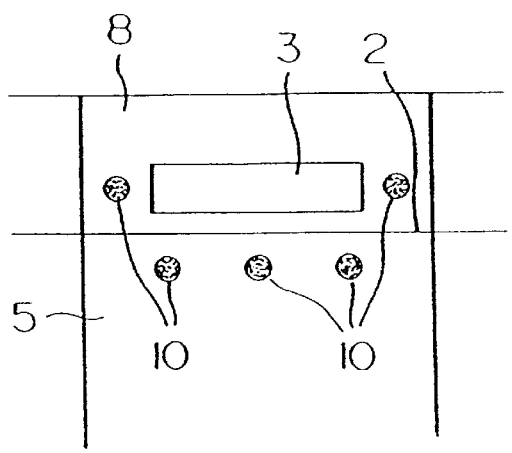
Figure 3A:
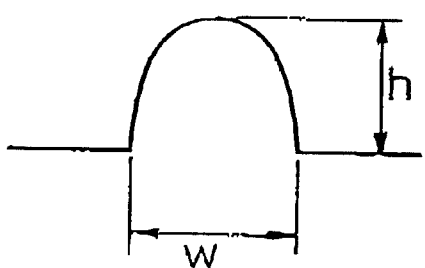
FIGS. 3A and 3B are enlarged front views showing the shape of a protrusion formed by using a Nd-YAG laser and quaternary higher harmonic as the laser beam of the laser, FIG. 3A being an enlarge front view when the output of the laser beam was 1.5 mW, and FIG. 3B being an enlarged front view when the output of the laser was 2 mW or 3 mW.
Figure 3B:
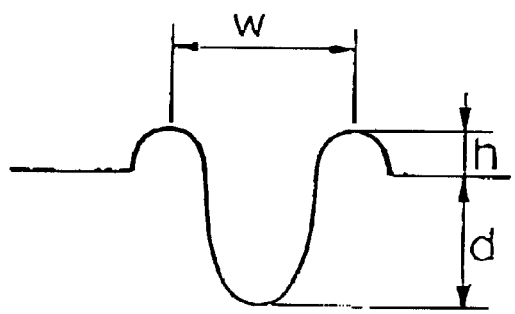

In FIG. 2A, protrusions 10 are formed near the trailing side end 2 of each of the opposite surfaces 5. The protrusions 10 have the shape shown in FIG. 3A or 3B. In FIG. 2B, the protrusions 10 are also formed on the protecting layer 8. In FIG. 2C, the protrusions 10 are formed near the trailing side end 2 of each of the face surfaces 5, and both sides of the thin film element 3. In the present invention, the number of the protrusions 10 and the position thereof are not limited. However, as many protrusions as possible are preferably formed near the thin film element 3 (on the protecting layer 8 and near the trailing side end 2 of each of the opposite surfaces 5).

When the protrusions 10 are formed on the leading side of the thin film element 3, for example, in the vicinity of the trailing side end 2 of each of the opposite surfaces 5, as shown in FIG. 2A, it is possible to prevent dust (contamination) on the disk from contacting the thin film element 3, and thus eliminate the possibility that the function of the thin film element 3 deteriorates. When the protrusions 10 are formed on both sides of the thin film element 3, as shown in FIG. 2C, it is possible to prevent contact of dust or the like on the disk during movement of the magnetic head between tracks, and thus eliminate the possibility that the function of the thin film element 3 deteriorates.

Figure 2D:
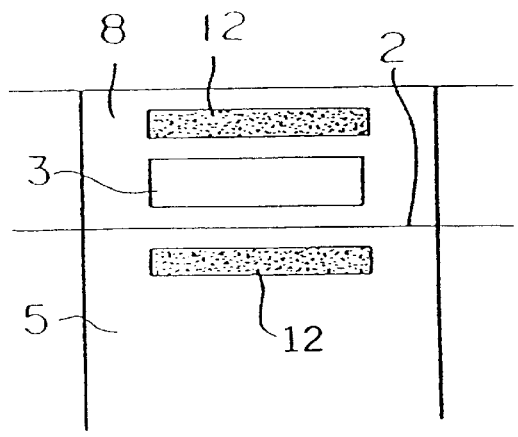

In the present invention, the shape of the protrusions 10 is not limited to those shown in FIGS. 2A to 2C, and rectangular protrusions 12 may be formed in a wall-like shape, as shown in FIG. 2D. In this way, the protrusions can be formed around the thin film element 3 by using a laser without damaging the thin film element 3, and protrusions having any desired shape can easily be formed.

The protrusions formed on the face surfaces 5 and the face surface the protecting layer 8 preferably have an average height within the range of 5 to 50 nm. If the average height of the protrusions is less than 5 nm, the real contact area between each of the face surfaces 5 of the slider 1 and the disk surface is increased, thereby increasing starting torque. If the average height of the protrusions exceeds 50 nm, the spacing is increased, and thus the recording density cannot be increased. Although described below, it was confirmed that the use of the laser used in the present invention enables the formation of the protrusions having an average height within the range of 5 to 50 nm.

The protrusions formed on the face surface of the protecting layer 8 and a portion of each of the face surfaces 5 in the vicinity (in the periphery of the thin film element 3) of the trailing side end 2 are preferably denser than the protrusions formed on a portion of each of the face surfaces 5 other than the vicinity of the trailing side end 2.

The protrusions formed on the face surface protecting layer and a portion of each of the face surfaces 5 in the vicinity of the trailing side end 2 frequently contacts and slides on the disk, and are thus easily worn. Therefore, when the protrusions are densely formed on the face surface protecting layer 8 and a portion of each of the face surfaces 5 in the vicinity of the trailing side end 2, it is possible to decrease the surface pressure applied to each of the protrusions and suppress the occurrence of wearing. However, if the protrusions are also densely formed on a portion of each of the face surfaces 5 other than the vicinity of the trailing side end 2, the starting torque in CSS is increased. Therefore, if the protrusions are densely formed only on the protecting layer 8 and regions of the face surfaces 5 in the vicinity of the end 2 on the trailing side (b), it is possible to decrease the starting torque in CSS and produce a magnetic head having excellent wear resistance.

In the present invention, since the protrusions are formed around the thin film element 3 and over the entire face surfaces 5, it is possible to prevent adhesion by a lubricant or water film coated on the disk surface. It is thus possible to decrease the starting torque for starting the disk. Particularly, by forming the protrusions around the thin film element 3, direct contact of the thin film element 3 with the disk surface can be avoided. Thus if the slider and the disk surface repeatedly slide on each other, the thin film element 3 is neither damaged nor worn.

As shown by hatching in FIG. 9 and FIGS. 10A to 10D, the opposite surfaces 5 and the protecting layer 8 are preferably coated with a hard carbon film 20 so that even if the protrusions formed on the face surfaces 5 and the protecting layer 8 contact the disk surface, the protrusions are hardly worn. The hard carbon thin film preferably has a thickness of about 5 to 15 nm.

The laser used in the present invention will be described in detail below.

The laser device used in the present invention can be exemplified by a Nd-YAG laser which exhibits excellent mass productivity and which is capable of easily forming the protrusions with appropriate dimensions. As the laser beam of the Nd-YAG laser, a quaternary higher harmonic (266 nm) or a secondary higher harmonic is preferably used. The quaternary higher harmonic and secondary higher harmonic have a short wavelength, and high-precision processing can be expected by using the quaternary or secondary higher harmonic as the laser beam.

Besides the Nd-YAG laser, an excimer laser (wavelength; 120 to 400 nm) using a gas such as Ar, Kr, Xe, ArF, KrF or the like may be used. The excimer laser has high energy and is capable of properly forming the protrusions even on a ceramic material having a single composition.

In order to form the protrusions by using the laser, the predetermined positions on the face surfaces 5 of the slider and the protecting layer 8 may be irradiated with the laser beam of the laser. The positions irradiated with the laser beam rise to form the protrusions. Before irradiation with the laser beam, the face surfaces 5 and the protecting layer 8 are preferably polished so that the average roughness (Ra) on the central line is 3 nm or less.

After the protrusions have been formed on the face surfaces 5 of the slider 1 and the protecting layer 8, as shown by hatching in FIG. 9 and FIGS. 10A to 10D, the hard carbon thin film 20 having a thickness of 5 to 15 nm is preferably formed to cover the face surfaces 5 and the protecting layer 8.

The protrusions were actually formed by the Nd-YAG laser or excimer laser, and the shape and dimensions of the protrusions were measured.

(Experiment 1: Processing by Nd-YAG Laser)

The slider 1 was formed of aluminum oxide-titanium carbide, and the face surfaces 5 of the slider 1 were polished so that the roughness (Ra) on the central line was 3 nm or less.

The face surfaces 5 were irradiated with laser by using the quaternary higher harmonic of the Nd-YAG laser while changing the output to 1.5 mW, 2 mW and 3 mW to form protrusions with each output.

The protrusions were measured by a surface shape measuring apparatus using laser interference. As a result, with an output of 1.5 mW, the protrusions had the shape shown in FIG. 3A, and with an output of 2 mW or 3 mW, the protrusions had the shape shown in FIG. 3B. Also the height h, width w and depth d of each of the protrusions were measured. The results are shown in Table 1.

TABLE 1

| | | 3 mW (1.5 μJ/pulse) | | | YAG4 Laser 2 mW (1.0 μJ/pulse) | | | | 1.5 mW (0.75 μJ/pulse) | | |
|---|---|---|---|---|---|---|---|---|---|---|---|
| Measurement point | H (nm) | D (nm) | W (μm) | Measurement point | H (nm) | D (nm) | W (μm) | Measurement point | H (nm) | D (nm) | W (μm) |
| 1 | 48.8 | 117 | 7.8 | 1 | 29.7 | 11.3 | 4.2 | 1 | 26.8 | | 4.2 |
| 2 | 28.3 | 124.7 | 8.3 | 2 | 48.8 | 46 | 4 | 2 | 25.4 | | 3.9 |
| 3 | 24.7 | 110.5 | 7.5 | 3 | 48.9 | 39.5 | 3.2 | 3 | 28.1 | | 2.6 |
| 4 | 35.4 | 143.6 | 8.6 | 4 | 46.4 | 35 | 3.9 | 4 | 24.5 | | 4.4 |
| 5 | 61.3 | 233.3 | 8.5 | 5 | 24.7 | 37.5 | 4.8 | 5 | 29.7 | | 4.2 |
| 6 | 46.1 | 111.2 | 8.3 | 6 | 29.4 | 41.1 | 3.9 | 6 | 30 | | 4.7 |
| 7 | 24.3 | 148.1 | 8.6 | 7 | 32 | 26.8 | 2.7 | 7 | 20.8 | | 3.9 |
| 8 | 61.8 | 173.4 | 7.8 | 8 | 24.7 | 64 | 5.3 | 8 | 26.4 | | 4.2 |
| 9 | 42 | 142.7 | 8.6 | 9 | 23.2 | 54.4 | 5.6 | 9 | 22 | | 3.6 |
| 10 | 38.8 | 135.6 | 8.7 | 10 | 26.5 | 42.6 | 4.4 | 10 | 18.8 | | 2.5 |
| Average | 41.15 | 144.01 | 8.27 | Average | 33.43 | 39.83 | 4.2 | Average | 25.25 | | 3.82 |
| Range | 37.5 | 122.8 | 1.2 | Range | 25.7 | 52.7 | 2.9 | Range | 11.2 | | 2.2 |
| max | 61.8 | 233.3 | 8.7 | max | 48.9 | 64 | 5.6 | max | 30 | | 4.7 |
| min | 24.3 | 110.5 | 7.5 | min | 23.2 | 11.3 | 2.7 | min | 18.8 | | 2.5 |

The table indicates that with an output of 1.5 mW, 2 mW and 3 mW, the average height of the protrusions was about 25 nm, 33 nm and 41 nm, respectively. It was thus found that the shape of the protrusions can be changed by changing the output, and that the average height can be increased by increasing the output.

As a result of EPMA (Electron Probe MIcroanalysis) of the protrusions and the peripheries thereof, the protrusions contained a large amount of Ti, and the peripheries thereof contained a large amount of Al. This indicates that in the case of aluminum oxide-titanium carbide, the protrusions are mainly formed of TiC. Since TiC has higher hardness than $Al_2O_3$, the protrusions made of TiC exhibits improved wear resistance and longer life, as compared with protrusions made of $Al_2O_3$. Even when the protecting layer 8 is formed, the wear resistance of the protrusions made of TiC is more improved than the protrusions made of $Al_2O_3$.

(Experiment 2: Processing by Excimer Laser)

A plurality of protrusions were formed on the face surfaces 5 of the slider 1 comprising aluminum oxide-titanium carbide by using an excimer laser (wavelength: 248 nm) using KrF gas.

As a result of measurement by a surface shape measuring apparatus using laser interference, the average height was 16 nm, the maximum height was 25 nm and the minimum height was 11 nm.

As a result of EPMA of the protrusions and the peripheries thereof, the protrusions contained a large amount of Ti, and the peripheries thereof contained a large amount of Al. It was thus found that in the case of aluminum oxide-titanium carbide, the protrusions are mainly made of TiC. This experiment was same as Experiment 1 in the point that the protrusions are preferably made of TiC.

It was thus found that the use of the Nd-YAG laser or excimer laser permits the formation of the protrusions having an average height in the range of 5 to 50 nm, and that the shape and average height of the protrusions can be arbitrarily changed by changing the output of the laser beam of the Nd-YAG layer.

Description will now be made of a second method of forming the protrusions by using the laser.

On the face surfaces 5 of the slider 1, which were polished, was coated a thermosetting resin. Since the thickness of the thermosetting resin is equal to the thickness of the protrusions, the thickness of the thermosetting resin is preferably about 5 to 50 nm.

Predetermined positions of the face surfaces were irradiated with the laser beam of the laser to cure the irradiated thermosetting resin. The uncured thermosetting resin was removed by etching. Photoresist may be used in place of the thermosetting resin.

This method is capable of easily forming the protrusions at any desired positions.

Figure 4A:
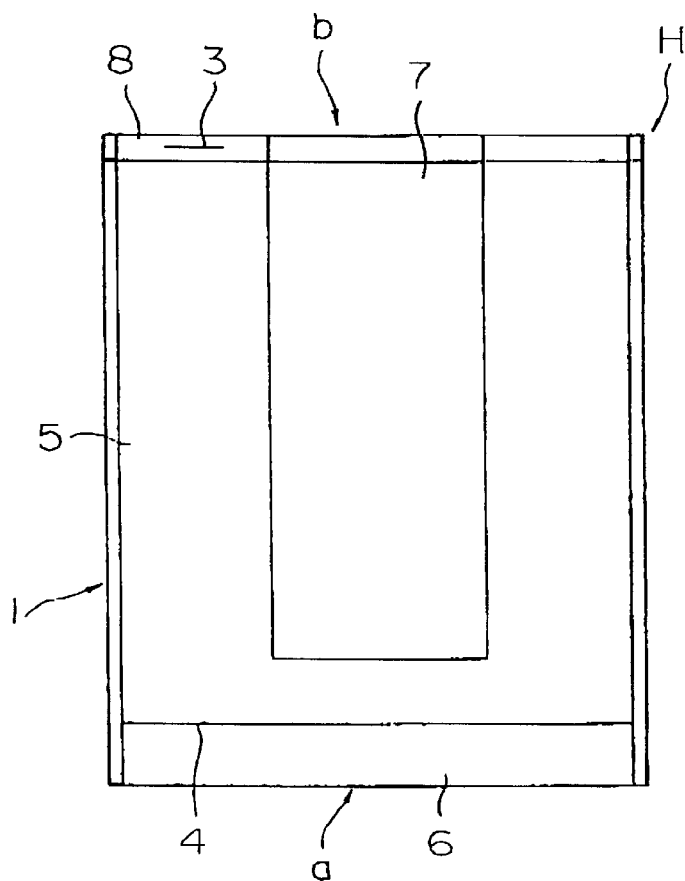
FIG. 4A is a plan view showing a magnetic head in accordance with a second embodiment of the present invention with a surface opposite to a disk upward.
Figure 4B:
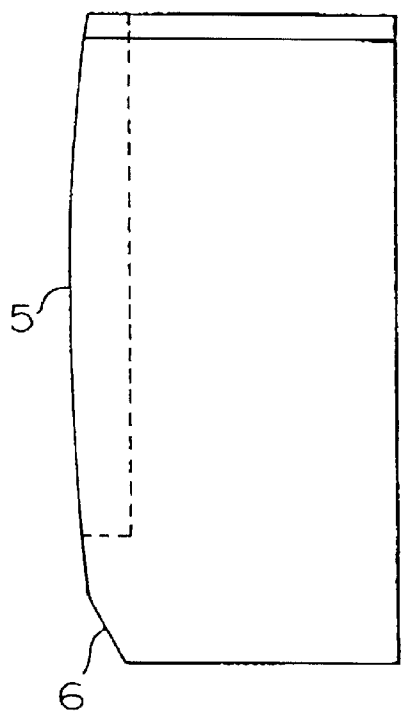
FIG. 4B is a right side view of the magnetic head shown in FIG. 4A.

FIG. 4A is a plan view of a magnetic head H in accordance with a second embodiment of the present invention with a face surface opposite to a recording medium upward. FIG. 4B is a right side view of the magnetic head shown in FIG. 4A.

As shown in the drawings, the face surface 5 of the slider 1 is continued on the leading side (a), not divided into two surfaces, unlike the face surfaces 5 shown in FIG. 1.

Like the magnetic head H shown in FIG. 1, the magnetic head H shown in FIG. 4 has protrusions which are formed on the face surface 5 and the periphery of the thin film element 3 by a laser. Therefore, it is possible to avoid direct contact between the thin film element 3 and the disk surface, decrease the static frictional force between the face surface 5 and the disk surface, and decrease the starting torque required for starting the disk.

Since the floating state of the magnetic head H shown in FIG. 4 is more stable than the magnetic head shown in FIG. 1, the spacing can be decreased, and the magnetic head H can be more effectively applied to high-density recording.

EXAMPLE

The magnetic head provided with the slider will be described below with reference to examples.

A plurality of protrusions 10 having an average height of 30 nm and a diameter of 4 μm were formed on the face surfaces 5 of the slider 1, and a hard carbon thin film of about 10 nm was formed to cover the face surfaces 5 to produce a magnetic head having the shape shown in FIG. 1. The thus-produced magnetic head was set in a hard disk device which was then started by a CSS (contact•start•stop) system, and the starting torque was measured.

Figure 5:
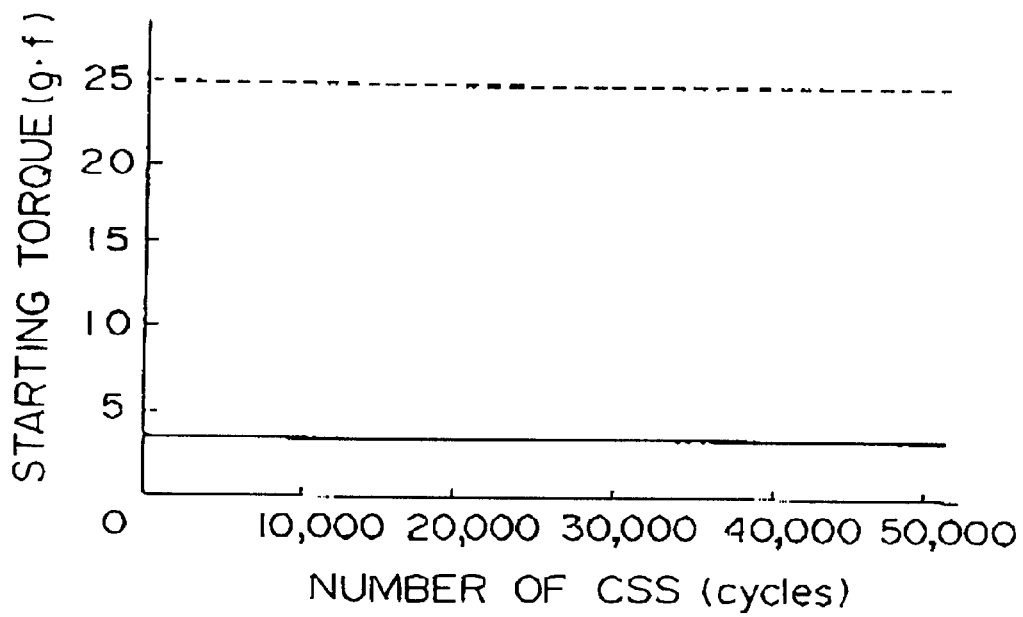
FIG. 5 is a graph showing the relation between the starting torque and the number of CSS of a magnetic head having the shape shown in FIG. 1 and a plurality of protrusions (average height; 30 nm, diameter; 4 μm) formed on the face surface of a slider.

FIG. 5 is a graph showing the relation between the number of CSS cycles and the starting torque. In FIG. 5, a dotted line is drawn at a starting torque of 25 (g·f), which indicate rating torque. In cases wherein starting torque higher than this line is required, a trouble easily occurs in which the hard disk device is not operated.

As shown in FIG. 5, the starting torque is substantially constant at about 4 (g·f) even if the number of CSS cycles increases. The reason for a staring torque of as low as about 4 (g·f) is that the real contact area between the slider 1 and the disk surface is decreased by forming the protrusions on the face surfaces. The reason why a substantially constant starting torque can be maintained even when the number of CSS cycles is increased is that the coating of the face surfaces 5 with the hard carbon thin film 20 prevents wearing even if the protrusions formed on the face surfaces 5 repeatedly slide on the disk surface.

Next, magnetic heads having the shape shown in FIG. 1 and different average heights of protrusions were produced in which the protrusions had a diameter of 5 μm and were formed on the face surfaces 5 of the slider 1 using a laser at constant intervals of 30 μm. Each of the thus-produced magnetic heads was set in a hard disk device, and the necessary starting torque was measured after the hard disk device had been started 30000 times.

Figure 6:
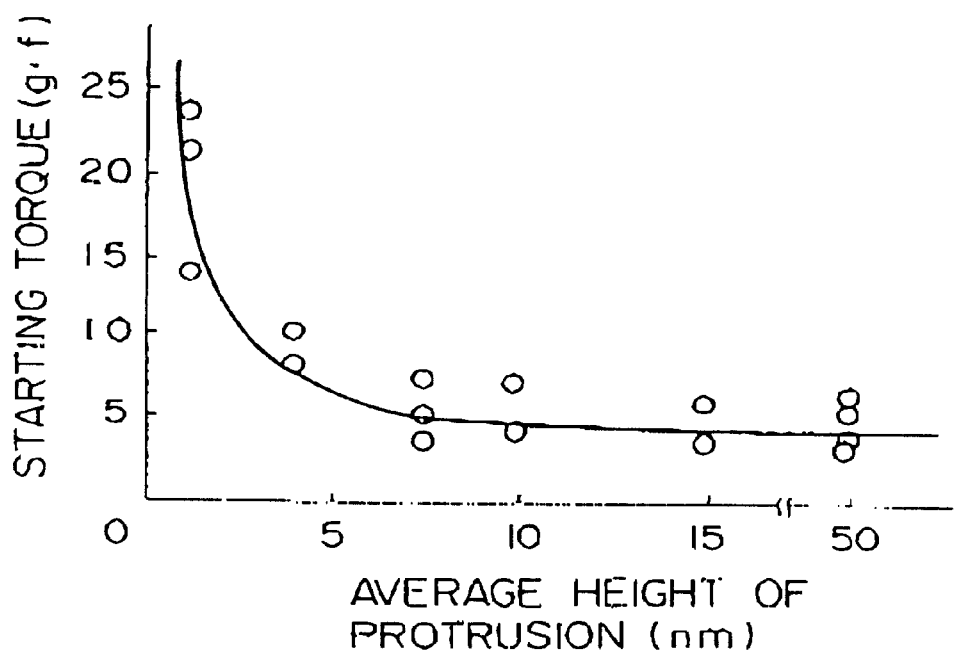
FIG. 6 is a graph showing the relation between the starting torque and the average height of protrusions after 30000 cycles of CSS, which were measured for a plurality of magnetic heads having the shape shown in FIG. 1 and different average heights of protrusions (diameter; 5 $\mu$m, protrusion interval; 30 $\mu$m) formed in the face surface of a slider.

FIG. 6 is a graph showing the relation between the average height of the protrusions and the starting torque.

FIG. 6 indicates that as the average height of the protrusions increases, the starting torque decreases. It was confirmed from the experimental results that the starting torque can be decreased by setting the average height of the protrusions to 5 nm or more.

This is possibly due to the fact that the real contact area between the face surfaces 5 and the disk surface can be decreased by increasing the average height of the protrusions, and the static frictional force is consequently decreased.

Next a magnetic head having the shape shown in FIG. 1 was produced by forming a plurality of protrusions 10 having an average height of 30 nm and a diameter of 4 m on the face surfaces 5 of the slider using a laser, and then forming a hard carbon thin film 20 of about 10 nm to coat the face surfaces 5. In this case, the element recess was 5 nm. Like the face surfaces 5, a hard carbon thin film of 10 nm was also formed on the disk surface to cover it.

The thus-produced magnetic head was set in a hard disk device, and the width dimensions of pulse signals were measured with different spacings.

Figure 7:
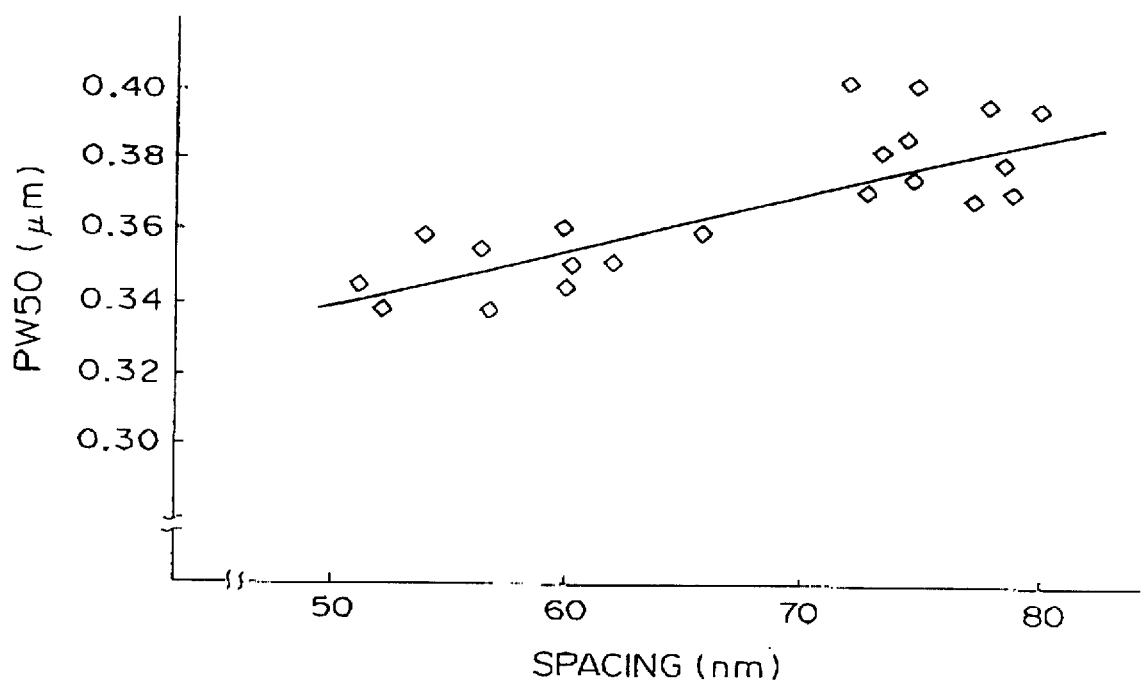
FIG. 7 is a graph showing the relation between PW50 and the spacing in a magnetic head having the shape shown in FIG. 1 and a plurality of protrusions (average height; 30 $\mu$m, diameter; 4 $\mu$m) formed in the face surface of a slider.
Figure 8A:
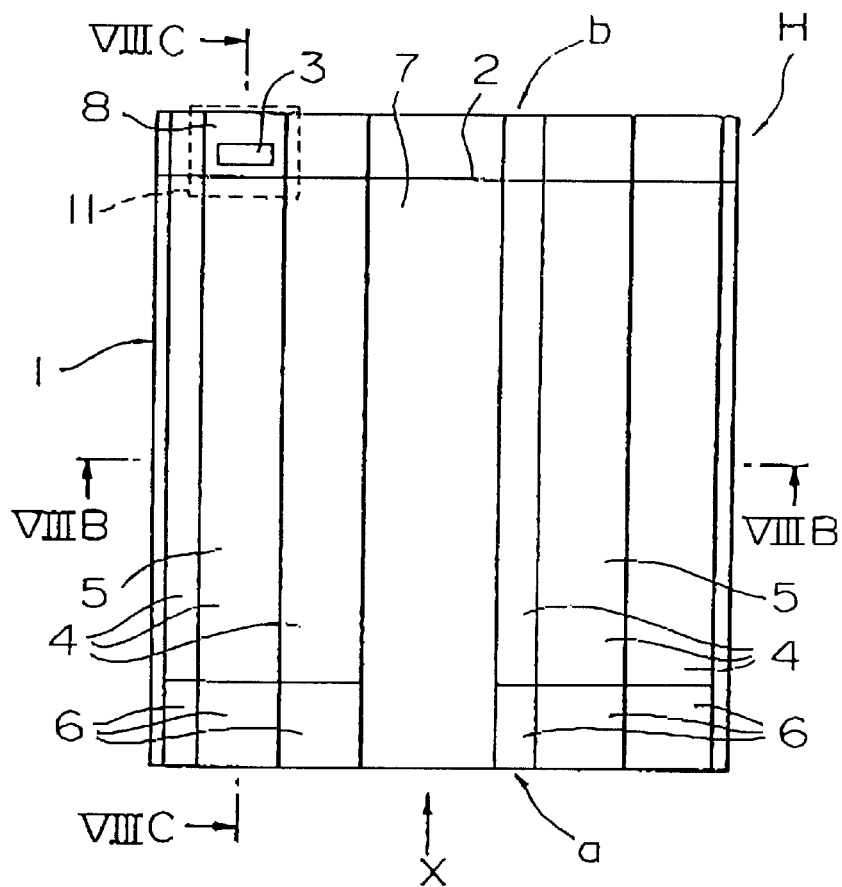
FIG. 8A is a plan view showing a conventional magnetic head with a face surface opposite to a disk upward.
Figure 8B:
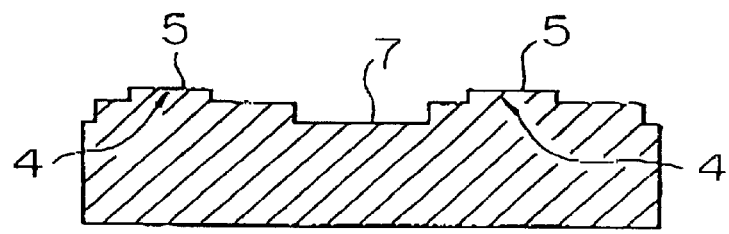
FIG. 8B is a sectional view taken along line VIIIB—VIIIB in FIG. 8A.
Figure 8C:
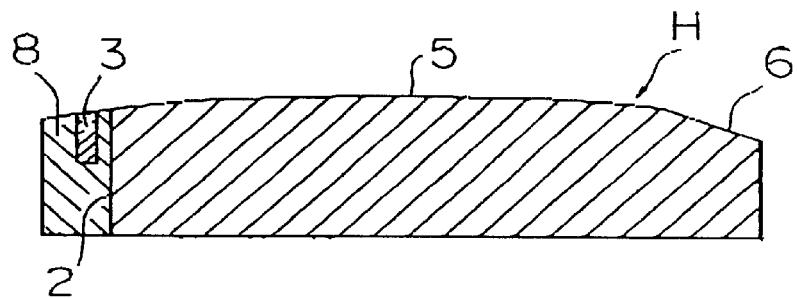
FIG. 8C is a sectional view taken along line VIIIC—VIIIC in FIG. 8A.
Figure 9:
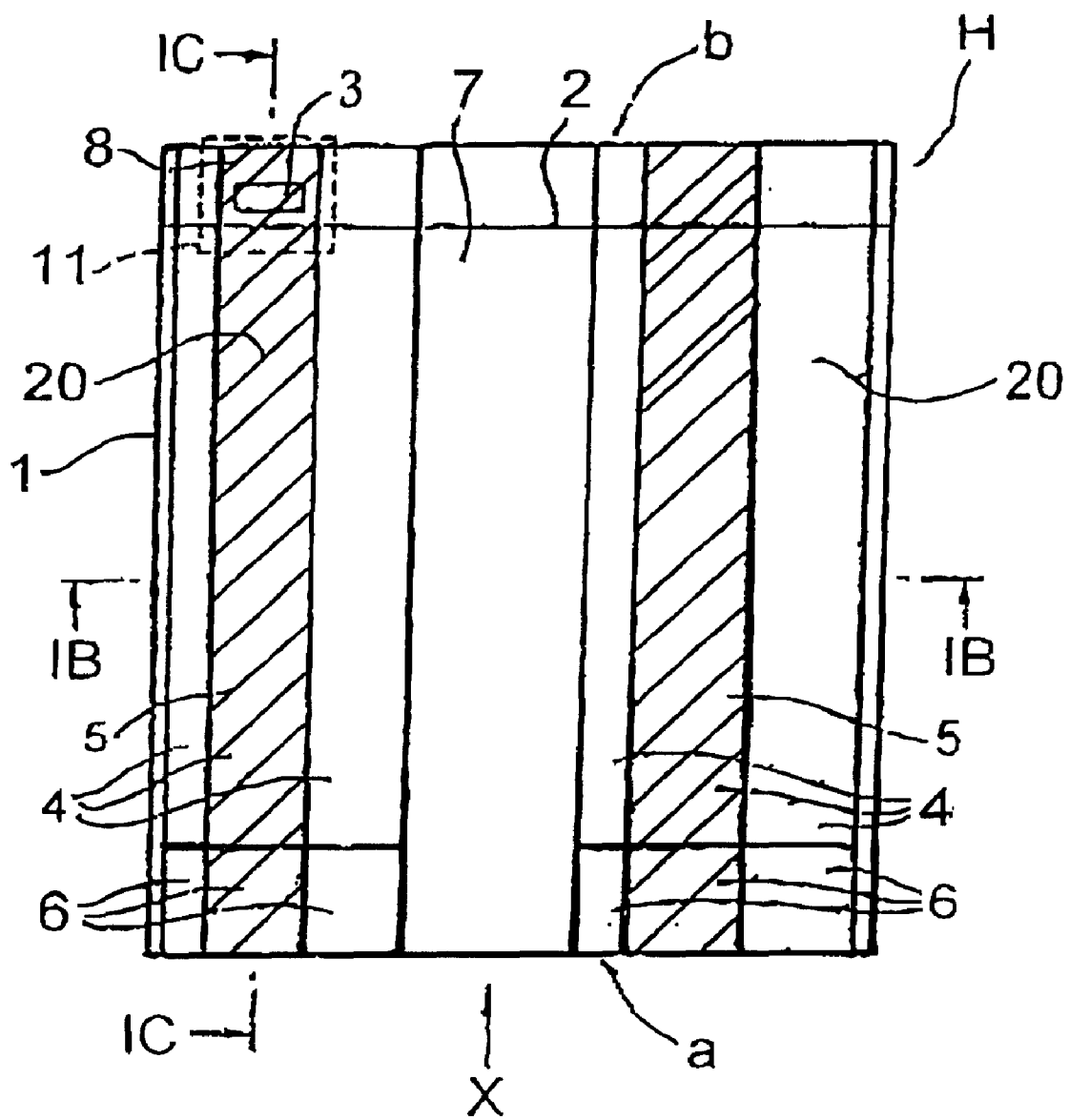
FIG. 9 is a plan view of the magnetic head shown in FIG. 1A in which surfaces opposite to the disk and protecting layers are coated with hard carbon thin films.
Figure 10A:
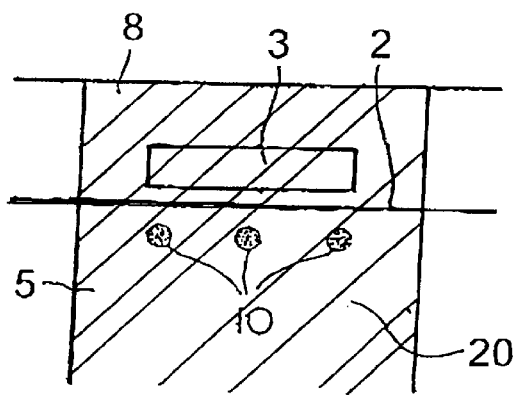
FIGS. 10A to 10D are plan views showing surface opposite to the disk and protecting layers in the periphery of the protrusions shown in FIGS. 2A to 2D coated with hard carbon thin films.
Figure 10B:
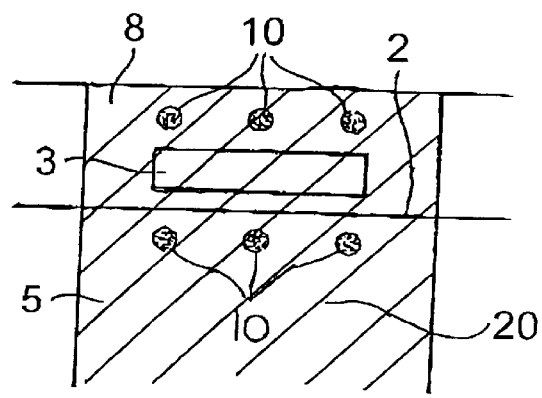
Figure 10C:
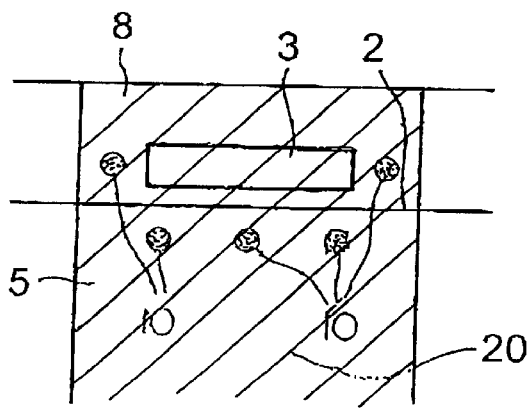
Figure 10D:
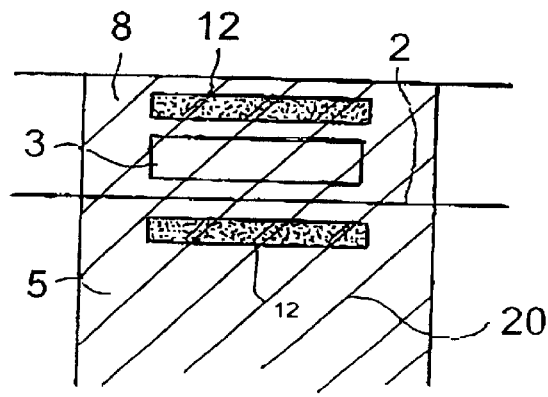

FIG. 7 is a graph showing the relation between the spacing and PW50. "PW50" represents the width dimension of a pulse signal at a ½ height.

FIG. 7 indicates that as the spacing increases, PW50 increases. Namely, as the spacing increases, the width dimension of a pulse signal increases, and thus the recording density decreases. Therefore the spacing is preferably as small as possible. Particularly, in order to obtain recording signals of 1 G (giga) per square inch, PW50 is preferably 0.38 μm or less, i.e., the spacing is preferably 75 nm or less.

Since the average height of the protrusions formed on the opposite surfaces 5 is obtained by subtracting the thickness (in this experiment, 10 nm) of the hard carbon thin film 20 formed on each of the face surfaces 5 and the disk surface and the element recess (in this experiment, 5 nm) from the spacing, the preferably average height of the protrusions is found to be 50 nm or less.

Even in the floating state wherein only the leading side (a) of the slider 1 floats on the disk surface and continuously or incontinuously slides on the trailing surface, in the present invention, a constant spacing is always kept between the slider 1 and the disk surface by the height of the protrusions and the thickness of the hard carbon thin film, and the output of the magnetic head can thus be stabilized.

FIGS. 6 and 7 indicate that the average height of the protrusions formed on the face surfaces 5 and the protecting layer 8 is preferably within the range of 5 to 50 nm, as described above.

In accordance with the present invention, it is possible to form protrusions in the periphery of a thin film element by a Nd-YAG layer or excimer laser without damaging the thin film element. Therefore the thin film element does not contact directly the disk surface, and thus the thin film element is neither damaged nor worn.

Also the use of the laser permits the formation of the protrusions by a small number of steps, and the formation of the protrusions in any desired portions. Further, since neither mechanical stress nor thermal stress is applied to the slider during laser processing, neither crack nor strain in a junction occurs. Further, the shape and the average height of the protrusions can be appropriately adjusted by changing the type and output of the laser beam of the laser used.

What is claimed is:

1. A method of producing a magnetic head that includes a slider which is made of a ceramic material, which contacts a surface of a recording medium when the recording medium is stopped, and which assumes a floating state where a trailing side end of the slider floats or slides on the recording medium by a floating force of a flow of air on the surface of the recording medium after the recording medium has been started, a thin film element provided at the trailing side end of the slider, and a protecting layer provided to cover the thin film element, wherein the method comprises:

smoothing the protecting layer and a face surface of the slider opposite to the recording medium, wherein smoothing the protecting layer comprises polishing the protecting layer to have a surface roughness of no more than about 3 nm, applying a laser beam to a surface selected from the group consisting of the protecting layer, the trailing side end of the face surface, and both the protecting layer and the trailing side end of the face surface to form protrusions on the surface, wherein applying the laser beam to form the protrusions comprises forming protrusions having a height above the thin film element; and forming a hard carbon thin film on the protecting layer and the face surface to cover the protecting layer and the face surface after the protrusions are formed.

2. The method of producing the magnetic head according to claim 1, wherein applying the laser beam comprises generating a secondary or quaternary harmonic laser beam with a Nd-TAG laser.

3. The method of producing the magnetic head according to claim 1, wherein applying the laser beam comprises generating the laser beam with an excimer laser.

4. The method of producing the magnetic head according to claim 1, wherein the ceramic material comprises a mixture of aluminum oxide and titanium carbide and wherein applying the laser beam to form protrusions comprises forming the protrusions substantially composed of titanium carbide.

5. The method of producing the magnetic head according to claim 4, wherein forming protrusion further comprises forming a peripheral region substantially composed of aluminum.

6. A method of producing a magnetic head that includes a slider which is made of a ceramic material, which contacts the surface of a recording medium when the recording medium is stopped, and which assumes a floating state where a trailing side end of the slider floats or slides on the recording medium by a floating force of a flow of air on the surface of the recording medium after the recording medium has been started, a thin film element provided at the trailing side end of the slider, and a protecting layer provided to cover the thin film element, wherein the method comprises:

smoothing the protecting layer and a face surface of the slider opposite to the recording medium;

applying a laser beam to a surface selected from the group consisting of the protecting layer, the trailing side end of the face surface, and both the protecting layer and the trailing side end of the face surface to form protrusions on the surface, wherein forming the protrusions comprises forming protrusions having a spatial density that is greater on the protecting layer and the trailing end than on other regions of the face surface of the slider.

7. A method of producing a magnetic head that includes a slider which is made of a ceramic material, which contacts the surface of a recording medium when the recording medium is stopped, and which assumes a floating state where a trailing side end of the slider floats or slides on the recording medium by a floating force of a flow of air on the surface of the recording medium after the recording medium has been started, a thin film element provided at the trailing side end of the slider, and a protecting layer provided to cover the thin film element, wherein the method comprises:

smoothing the protecting layer and a face surface of the slider opposite to the recording medium;

applying a laser beam to a surface selected from the group consisting of the protecting layer, the trailing side end of the face surface, and both the protecting layer and the trailing side end of the face surface to form protrusions on the surface, wherein applying the laser beam to form protrusions comprises one of applying the laser beam at a first power output to form dome-shaped the protrusions and applying the laser beam at a second power output to form two dome-shaped protrusions with a depression therebetween, wherein the second power output is greater than the first power output.

* * * * *

UNITED STATES PATENT AND TRADEMARK OFFICE
CERTIFICATE OF CORRECTION

PATENT NO. : 6,591,478 B2
DATED : July 15, 2003
INVENTOR(S) : Hirohisa Ishihara et al.

It is certified that error appears in the above-identified patent and that said Letters Patent is hereby corrected as shown below:

Title page,
Item [30], Foreign Application Priority Data, delete "9-048250" and substitute -- 9-48250 -- in its place.

Column 2,
Line 1, after "6/1998 Tian" insert -- et al. --.

Column 12,
Line 35, after "3 mm" delete "," (comma) and substitute -- ; -- (semicolon) in its place.

Column 14
Line 18, before "protrusions" insert -- the --.
Line 20, delete "the" before "protrusions".

Signed and Sealed this

Thirteenth Day of January, 2004

JON W. DUDAS
*Acting Director of the United States Patent and Trademark Office*